United States Patent [19]

Weder

[11] Patent Number: 5,417,033

[45] Date of Patent: * May 23, 1995

[54] MEANS FOR SECURING A DECORATIVE COVER ABOUT A FLOWER POT

[75] Inventor: Donald E. Weder, Highland, Ill.

[73] Assignee: Highland Supply Corporation, Highland, Ill.

[*] Notice: The portion of the term of this patent subsequent to Apr. 21, 2009 has been disclaimed.

[21] Appl. No.: 124,843

[22] Filed: Sep. 21, 1993

Related U.S. Application Data

[63] Continuation of Ser. No. 819,311, Jan. 9, 1992, abandoned, which is a continuation of Ser. No. 765,416, Sep. 26, 1991, Pat. No. 5,105,599, which is a continuation of Ser. No. 530,491, May 29, 1990, abandoned, which is a continuation of Ser. No. 315,169, Feb. 24, 1989, abandoned.

[51] Int. Cl.$^6$ ................. B65B 11/58; B65B 27/00
[52] U.S. Cl. ......................... 53/399; 53/397; 53/449; 53/464; 47/72
[58] Field of Search ............ 53/138.1, 397, 399, 53/449, 464, 176, 221, 390, 580, 582, 583, 585, 592; 47/72; 100/2, 9, 212; 215/12.1; 229/45

[56] References Cited

U.S. PATENT DOCUMENTS

| Re. 27,744 | 8/1973 | Billett et al. . |
|---|---|---|
| Re. 31,354 | 8/1983 | Cheung . |
| D. 295,525 | 5/1988 | Sakaki et al. . |
| 1,964,887 | 7/1934 | Lovett, Jr. . |
| 1,994,962 | 3/1935 | Rushfeldt . |
| 2,133,278 | 10/1938 | Brodgen . |
| 2,236,936 | 4/1941 | Camp . |
| 2,274,526 | 2/1942 | Bunn . |
| 2,367,168 | 1/1945 | Cheesman . |
| 2,514,038 | 7/1950 | Doolittle ............ 53/414 X |
| 2,774,187 | 12/1956 | Smithers . |
| 2,882,660 | 4/1959 | Denton . |
| 2,924,926 | 2/1960 | Paine, Jr. ............ 53/585 X |
| 3,015,916 | 1/1962 | Denton . |
| 3,078,631 | 2/1963 | Seserman . |
| 3,104,937 | 9/1963 | Wyckoff . |
| 3,125,907 | 3/1964 | Derrickson . |
| 3,126,686 | 3/1964 | Kobylanski . |
| 3,129,728 | 4/1964 | Sharko . |
| 3,135,192 | 6/1964 | Derrickson . |
| 3,152,539 | 10/1964 | Sorensen . |
| 3,163,899 | 1/1965 | Karass . |
| 3,164,372 | 1/1965 | Derrickson . |
| 3,186,333 | 6/1965 | Hoffman et al. . |
| 3,189,060 | 6/1965 | Attas . |
| 3,192,584 | 7/1965 | Pape . |
| 3,204,312 | 9/1965 | Derrickson et al. . |
| 3,224,363 | 12/1965 | Talbot . |
| 3,251,295 | 5/1966 | Dickens . |
| 3,258,221 | 6/1966 | Derrickson et al. . |
| 3,263,599 | 8/1966 | Dickens . |
| 3,264,022 | 8/1966 | Talbot . |
| 3,279,354 | 10/1966 | Dickens . |
| 3,288,055 | 11/1966 | Vellrath . |
| 3,316,675 | 5/1967 | Cartwright, Jr. . |
| 3,316,687 | 5/1967 | Bartlett, Jr. . |
| 3,318,230 | 5/1967 | Hilton . |
| 3,324,317 | 6/1967 | Armstrong et al. . |
| 3,368,323 | 2/1968 | Wood . |
| 3,393,633 | 7/1968 | Hoffman et al. . |

(List continued on next page.)

FOREIGN PATENT DOCUMENTS 1084888 10/1953 France .
15550 of 1899 United Kingdom .

OTHER PUBLICATIONS

Brochure, "The Original Pre-Formed Pot Cover", Highland Supply Corp.–1989.

(List continued on next page.)

Primary Examiner—Linda B. Johnson
Attorney, Agent, or Firm—Dunlap & Codding

[57] ABSTRACT

A method and apparatus for securing a sheet of material about a flower pot for providing a decorative cover to the flower pot, using a band applicator with an object opening. The sheet of material is held in place on the flower pot and the flower pot with the sheet of material held there about is inserted into the object opening of the band applicator. The band applicator applies a band about the sheet of material and the flower pot whereby the sheet of material is secured to the flower pot via the band.

2 Claims, 2 Drawing Sheets

U.S. PATENT DOCUMENTS

| | | | |
|---|---|---|---|
| 3,431,706 | 3/1969 | Stuck | 53/390 |
| 3,515,055 | 6/1970 | Timmerbeil et al. . | |
| 3,531,910 | 10/1970 | Snead | 53/221 X |
| 3,545,723 | 12/1970 | Raley . | |
| 3,554,846 | 1/1971 | Billett . | |
| 3,612,480 | 10/1971 | Guy . | |
| 3,612,481 | 10/1971 | Guy . | |
| 3,636,861 | 1/1971 | Weller . | |
| 3,639,530 | 2/1972 | Ryan . | |
| 3,662,790 | 5/1972 | Styner . | |
| 3,691,939 | 9/1972 | Goodley . | |
| 3,709,758 | 1/1973 | Gilmore . | |
| 3,750,239 | 8/1973 | Styner . | |
| 3,759,169 | 9/1973 | Goodley . | |
| 3,783,079 | 1/1974 | Wehr . | |
| 3,799,835 | 3/1974 | Gilmore . | |
| 3,826,443 | 7/1974 | Goodley . | |
| 3,841,213 | 10/1974 | Goodley . | |
| 3,847,071 | 11/1974 | Goodley . | |
| 3,851,683 | 12/1974 | Glaus et al. . | |
| 3,873,387 | 3/1975 | Schoening . | |
| 3,896,525 | 7/1975 | Stewart et al. . | |
| 3,924,354 | 12/1975 | Gregoire . | |
| 3,949,662 | 4/1976 | Woomer . | |
| 3,963,191 | 6/1976 | Goodley . | |
| 3,974,762 | 8/1976 | Kita et al. | 53/585 X |
| 3,984,278 | 10/1976 | Styner et al. . | |
| 3,995,409 | 12/1976 | Discavage et al. . | |
| 4,005,647 | 2/1977 | Goodley . | |
| 4,020,756 | 5/1977 | Weiss . | |
| 4,020,879 | 5/1977 | Billett et al. . | |
| 4,054,160 | 10/1977 | Knudsen . | |
| 4,062,918 | 12/1977 | Nakanose . | |
| 4,086,117 | 4/1978 | Pearsall . | |
| 4,090,008 | 5/1978 | Haley . | |
| 4,093,146 | 6/1978 | Haley . | |
| 4,096,019 | 6/1978 | Lehmann . | |
| 4,101,625 | 7/1978 | Haley . | |
| 4,137,788 | 2/1979 | Fischer . | |
| 4,143,594 | 3/1979 | Falq . | |
| 4,152,475 | 5/1979 | Haley . | |
| 4,189,868 | 2/1980 | Tymchuck et al. . | |
| 4,216,620 | 8/1980 | Weder . | |
| 4,220,493 | 9/1980 | Wehr et al. . | |
| 4,223,704 | 9/1980 | Glaus . | |
| 4,227,949 | 10/1980 | Wehr . | |
| 4,252,158 | 2/1981 | McDade . | |
| 4,253,227 | 3/1981 | Bullington . | |
| 4,254,703 | 3/1981 | Fulton et al. . | |
| 4,297,811 | 11/1981 | Weder . | |
| 4,300,312 | 11/1981 | Weder . | |
| 4,300,976 | 11/1981 | Wehr . | |
| 4,328,742 | 5/1982 | Discavage . | |
| 4,362,096 | 12/1982 | Hanscom . | |
| 4,383,881 | 5/1983 | Sakaki . | |
| 4,401,020 | 8/1983 | Brux . | |
| 4,444,097 | 4/1984 | Wehr et al. . | |
| 4,450,032 | 5/1984 | Wehr . | |
| 4,454,808 | 6/1984 | Wehr et al. . | |
| 4,470,241 | 9/1984 | Parry et al. | 53/390 X |
| 4,483,516 | 11/1984 | Wehr . | |
| 4,533,046 | 8/1985 | Kunhert et al. . | |
| 4,536,248 | 8/1985 | Bullington et al. . | |
| 4,554,779 | 11/1985 | Fischer . | |
| 4,555,893 | 12/1985 | Nakata et al. | 53/390 |
| 4,570,415 | 2/1986 | Centeno . | |
| 4,572,251 | 2/1986 | Drury | 53/390 X |
| 4,635,542 | 1/1987 | Sebelist et al. . | |
| 4,711,071 | 12/1987 | Kagi . | |
| 4,718,219 | 1/1988 | Schmitz . | |
| 4,725,009 | 2/1988 | Fahrbach . | |
| 4,733,182 | 9/1988 | Weder . | |
| 4,733,521 | 3/1988 | Weder et al. | 53/221 X |
| 4,768,276 | 9/1988 | Harlow . | |
| 4,773,182 | 9/1988 | Weder et al. . | |
| 4,835,834 | 1/1989 | Weder . | |
| 4,901,423 | 2/1990 | Weder . | |
| 5,077,937 | 1/1992 | Weder et al. . | |
| 5,105,599 | 4/1992 | Weder | 53/399 |
| 5,111,638 | 5/1992 | Weder . | |
| 5,129,182 | 7/1992 | Weder . | |
| 5,181,364 | 1/1993 | Weder . | |
| 5,184,390 | 2/1993 | Weder . | |
| 5,231,794 | 8/1993 | Weder et al. . | |

OTHER PUBLICATIONS

Exhibit I-Strapack Corp., Tokyo, Japan, StraPack Semiautomatic Strapping Machine, Sivaron S-662 (two pages, no date).

Exhitib J-Strapack Corp., Tokyo, Japan, StraPack Semiautomatic Polypropylene Strapping Machine, Sivaron SS-40 (two pages, no date).

Exhibit K-Strapack Corp., Tokyo, Japan, StraPack Semiautomatic Strapping Machines, Sivaron S-661 S661L (two pages, no date).

Exhibit L-Universal Strapping Corp., Brooklyn, N.Y., Universal Strapping Semiautomatic Plastic Strapping Machine, (two pages, no date).

Exhibit M-Universal Strapping Corp., Brooklyn, N.Y., (List continued on next page.)

OTHER PUBLICATIONS

Exhibit A–Rubber Band Technology Ltd., Yakima, Wash., BandMaster 102 model AF. Form RBT 9-88.
Exhibit B–Rubber Band Technology, Ltd., Yakima, Wash., BandMaster 102 model ET. Form RBT 10-88.
Exhibit C–Strapack Inc., Tokyo, Japan, Sivaron S–661 & 661Y. Copyright 1984 Strapack Corp.
Exhibit D–Strapack Inc., Tokyo, Japan, StraPack Semi-automatic Strapping Machine S–660. Copyright 1988 Strapack Corp.
Exhibit E–Universal Strapping Corp., Uni-Pac Portable Strapping Kit (no date).
Exhibit F–Cyklop Strapping Corp., Downingtown, Penna., Cyklop EM-15 (two pages). Copyright 1987, Cyklop Strapping Corporation.
Exhibit G–Strapex Corp., Charlotte, N.C., How to Strap Without Getting in a Bind (two pages, no date).
Exhibit H–Cyklop Strapping Corp., Downingtown, Penna., ASM Series (two pages). Copyright 1988 Cyklop Strapping Corporation.
Universal Strapping Extruders of Plastic Strapping (eight pages, no date).
Exhibit N–Malow Corp., Mount Prospect, Ill., Heavy Duty Tyer (two pages, no date).
Exhibit O–Rubber Band Technology, Ltd. Yakima, Wash., Band Master 101, Model MF (one page, no date).
Exhibit P–Rubber Band Technology, Ltd., Yakima, Wash., Band Master, 103 Medal ET (one page, no date).
Exhibit Q–Rubber Band Technology Ltd., Yakima, Wash., Band Master, 201 Model B (one page, no date).
Exhibit R–B. H. Bunn Company, Alsip, Ill., Strapping Efficiency for Every Strapping Application, brochure no. M20M–475 (six pages, no date).
Exhibit S–B. H. Bunn Company, Lakeland, Fla., Bunn Models 1691, 1991, 2091, 2491, and 3091 Tying Machines brochure, Copyright 1992 (three pages).
Exhibit T–EAM Industries, W. Hazelton, Pa., EAM Mosca Strapping System brochure (six pages, no date).
Exhibit U–EAM Industries, W. Hazelton, Pa., COM Taping Machine brochure (two pages, no date).
Exhibit V–Clements Industries, Inc., South Hackensack, N.J., Tach-It Twisters, Packaging Machines . . . Bag Openers . . . Tape Winders . . . bundlers advetisement (one page, 1986).
Exhibit W–Clements Industries, Inc., South Hackensack, N.J., Tach-It Twisters, Model 3558 advetisement (one page, 1986).
Exhibit X–Interpower Packaging, Hodgkins, Ill., Akebono OB–300 brochure (two pages, no date).
Exhibit Y–InterPower Packaging, Hodgkins, Ill., Power 260 brochure (two pages, 1991).
Exhibit Z–The John Henry Company, Cellocoup Brochure, copyright 1992 (four pages).
Exhibit AA–Saxmayer Corporation, St. Blissfield, Mich., Twine Tying Machines brochure (seven pages, no date).
Exhibit BB–Saxmayer Corporation, St. Blissfield, Mich., Model 6 String Tyer brochure (two pages, no date).
Exhibit CC–Saxmayer Corporation, St. Blissfield, Mich., Model EM Route-Master brochure (two pages, no date).
Exhibit DD–Felins, Inc., Milwaukee, Wis., Pak-Tyer 2000 brochure (four pages, 1991).
Exhibit EE–"Color Them Happy With Highlander Products", ©1992, 2 pages.
Exhibit FF–"Super Seller", Supermarket Floral, Sep. 15, 1992.
Exhibit GG–"Costa Keeps The Christmas Spirit", Supermarket, Sep. 15, 1992.
Exhibit HH–"Now, More Than Ever", Supermarket Floral, Sep. 15, 1992.
Exhibit II–"Halloween", Link Magazine, Sep. 1992, 2 pages.
Exhibit JJ–Speed Cover® Brochure, "The Simple Solution For Those Peak Volume Periods", Highland Supply Speed Cover ® Brochure, ©1989, 6 pages.
Exhibit KK–"Speed Sheets ® And Speed Rolls", Highland Supply Speed Sheets® Brochure, 1990©, 2 pages.
Exhibit LL–Olimex Brochure, 6 pages.

' 5,417,033

MEANS FOR SECURING A DECORATIVE COVER ABOUT A FLOWER POT

CROSS REFERENCE TO RELATED APPLICATIONS

This application is a continuation of U.S. patent application Ser. No. 07/819,311 filed Jan. 9, 1992, now abandoned, which is a continuation of U.S. patent application Ser. No. 07/765,416 filed Sep. 26, 1991, now U.S. Pat. No. 5,105,599, which is a continuation of U.S. patent application Ser. No. 07/530,491 filed May 29, 1990, now abandoned, which is a continuation of U.S. patent application Ser. No. 07/315,169 filed Feb. 24, 1989, now abandoned.

FIELD OF THE INVENTION

The present invention relates generally to means for applying a sheet of material generally about the outer peripheral surface of a flower pot utilizing a band applicator.

BRIEF DESCRIPTION OF THE DRAWING

Figure 1:
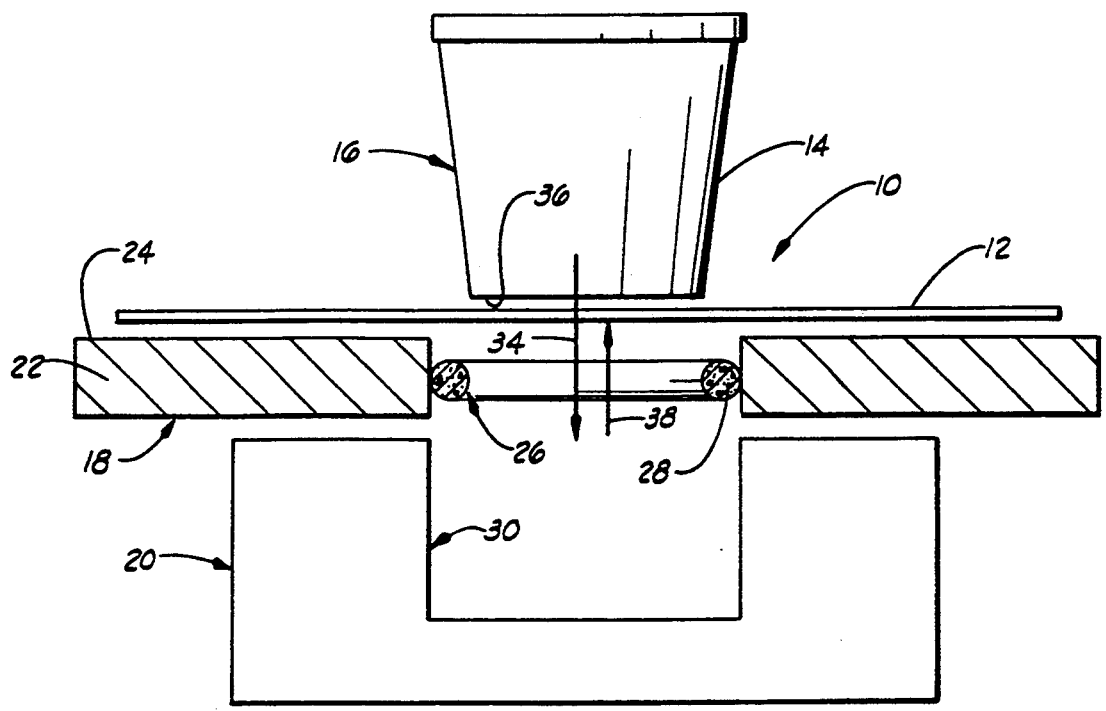
FIG. 1 is a sectional, diagrammatic view illustrating a flower pot generally positioned above a sheet of material and a band applicator in position for applying the sheet of material generally about the outer peripheral surface of the flower pot.
Figure 2:
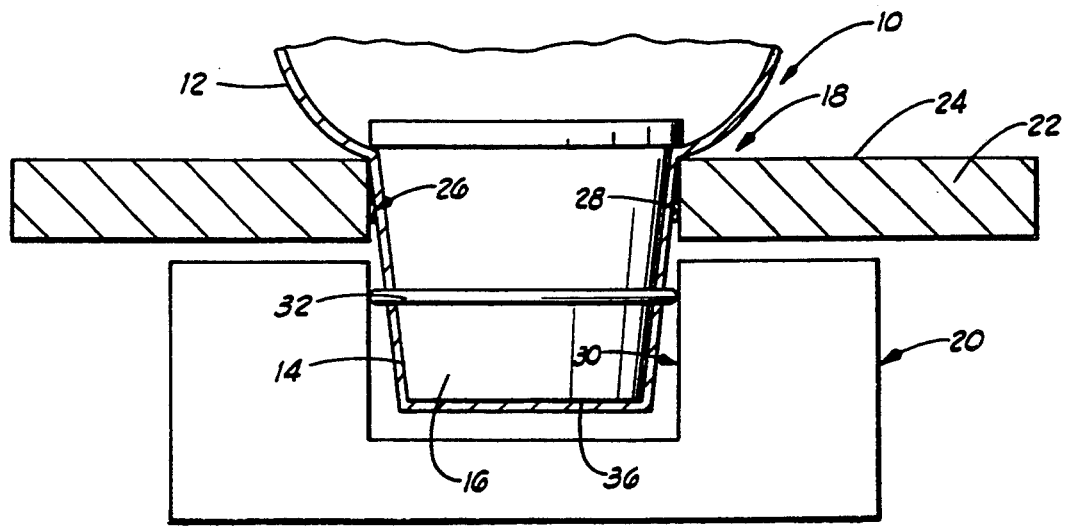
FIG. 2 is similar to FIG. 1 but showing the flower pot moved into the object opening of the band applicator with the sheet of material held in place about the outer peripheral surface of the flower pot by a band.

Shown in FIGS. 1 and 2 and designated therein by the general reference numeral 10 is a system for securing a sheet of material 12 generally about an outer peripheral surface 14 of a flower pot 16 generally for the purpose of providing a decorative cover for the flower pot 16. The system 10 includes a cover forming device 18 and a band applicator 20.

The cover forming device 18 comprises a platform 22 having an upper support surface 24 and a flower pot opening 26 which is formed therethrough and intersects the support surface 24. A generally circularly shaped applicator 28 is supported on the platform 22 and the applicator 28 preferably is constructed of a foam-like material adapted to engage the material and the flower pot without damaging the material or the flower pot. The opening through the applicator 28 forms the flower pot opening 26. A cover forming device which is constructed and operates like the covering forming device 18 is described in detail in U.S. Pat. No. 4,733,521 entitled COVER FORMING APPARATUS, incorporated specifically herein by reference.

The sheet of material 12 may be a shape sustaining material such as a foil for example or a non-shape sustaining cellophane or processed organic polymer film material such as a processed organic polymer film like a polypropylene film for example. The term "processed organic polymer film" as used herein means a manmade resin such as a polypropylene as opposed to naturally occurring resins such as cellophane. A processed organic polymer film is relatively strong and not subject to tearing (substantially non-tearable), as might be the case with paper or foil. The processed organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desireable in many applications which is not the case with an untreated paper, for example, unless the paper is treated with a water resistant coating or impregnated with water a resistant material or laminated with such water resistant material. It also should be noted that some papers, such as long fiber papers, are substantially resistant to tearing (substantially non-tearable when used as a placed in accordance with the present invention). In addition, a relatively thin film of a substantially linearly linked processed organic polymer does not substantially deteriorate in sunlight. Processed organic polymer films having carbon atoms, both linearly linked and cross linked, and some cross linked polymer films, also may be suitable for use in the present invention provided such films are substantially flexible, can be made in a sheet-like format for forming into the package 10 of the present invention.

A decorative pattern, such as a solid color and/or an embossed pattern, and/or other decorative surface ornamentation may be applied to the inner surface and/or the outer surface of the container 14.

The flower pot cover 10 may be constructed of a single sheet of material or a plurality of sheets of material. When constructed of a plurality of sheets of material, each sheet of material has a thickness in a range of from less than about 1.0 mil to about 2.5 mils. However, the upper limit on the thickness of each sheet of material could be as high as 20.0 mils depending on the type of material selected. Further, the resulting flower pot cover has a thickness in a range of from less than about 1.0 mils to about 2.5 mils which could be as high as 20.0 mils depending upon the number of sheets of material utilized and the type of materials selected.

The band applicator 20 includes an object opening 30 which is sized to receive a portion of a flower pot. The band applicator 30 is constructed and adapted to substantially automatically apply a band about an object placed within the object opening 30. The term "band" as used herein means any material which may be secured about an object such as the flower pot 16 such as bands commonly referred to as elastic bands or rubber bands and also includes any other type of material such as string or metal or rubber or plastic which may be secured about an object such as the flower pot 16. Band applicators which are constructed to operate like the band applicator 20 described herein are commercially available such as the band applicator available from Rubber Band Technology Limited of Yaykima, Wash. and referred to or identified by their mark "BandMaster". Thus, a detail description of the construction and operation of the band applicator is not deemed necessary herein.

In general, the sheet of material 12 is formed generally about the outer peripheral surface 14 of the flower pot 16 and the flower pot 16 with the sheet of material 12 formed generally about the outer peripheral surface 14 thereof is placed into the object opening 30 of the band applicator 20. After the flower pot 16 with the sheet of material 12 formed thereabout is placed into the object opening 30, the band applicator 20 is accuated to cause a band 32 to be applied about the material and generally about the outer peripheral surface 14 of the flower pot 16. The band 32 cooperates to secure the sheet of material 12 in position disposed generally about the outer peripheral surface 14 of the flower pot 16. After the band 32 has been applied to the outer peripheral surface 14 and about the sheet of material 12, the flower pot 16 with the sheet of material 12 secured thereto by the band 32 is removed from the object opening 30 and the band applicator 20.

The sheet of material 12 is held in place disposed generally about the outer peripheral surface 14 of the flower pot 16 while the flower pot 16 with the sheet of material 12 is disposed in the object opening and during the applying of the band 32 to the flower pot 16. In some applications, the sheet of material 12 may be held by hand formed generally about the outer peripheral surface 14 of the flower pot 16 while the flower pot 16 with the sheet of material held thereabout is disposed in the object opening 30 for applying band 32 thereto.

As shown in FIGS. 1 and 2 and in one preferred form, the cover forming device 18 is used to hold the sheet of material 12 in place generally about the outer peripheral surface 14 of the flower pot 16 during the applying of the band 32. The sheet of material 12 is placed on the upper surface 24 of the platform 22 and positioned so that the sheet of material 12 generally is centered over the flower pot opening 26. The flower pot 16 then is positioned generally above the flower pot opening 26 and above the sheet of material 12. The flower pot 16 then is moved in a downwardly direction 34 to a position wherein a lower end 36 of the flower pot 16 engages a central portion of the sheet of material 12. The flower pot 16 then further is moved in the downward direction 34 thereby pushing the flower pot 16 along with a portion of the sheet of material 12 generally in the downwardly direction 34 and through the flower pot opening 26. The flower pot 16 with the sheet of material 12 formed thereabout further is moved in a downward direction 34 to position the lower end 36 portion of the flower pot 16 generally within the object opening 30 and the band applicator 20. The sheet of material 12 is held position generally about the outer peripheral surface 14 of the flower pot 16 by the applicator 28. In this position, the band applicator 20 is actuated to apply the band 32 generally about the sheet of material and about the outer peripheral surface 14 of the flower pot 16. After the band 32 has been applied about the sheet of material 12 in the flower pot 16, the flower pot 16 then is moved in an upward direction 38 to remove the flower pot 16 from the object opening 30 and the flower pot opening 26. The sheet of material 12 is held in position extending about the flower pot 16 by the band 32.

EMBODIMENT OF FIG. 3

Figure 3:
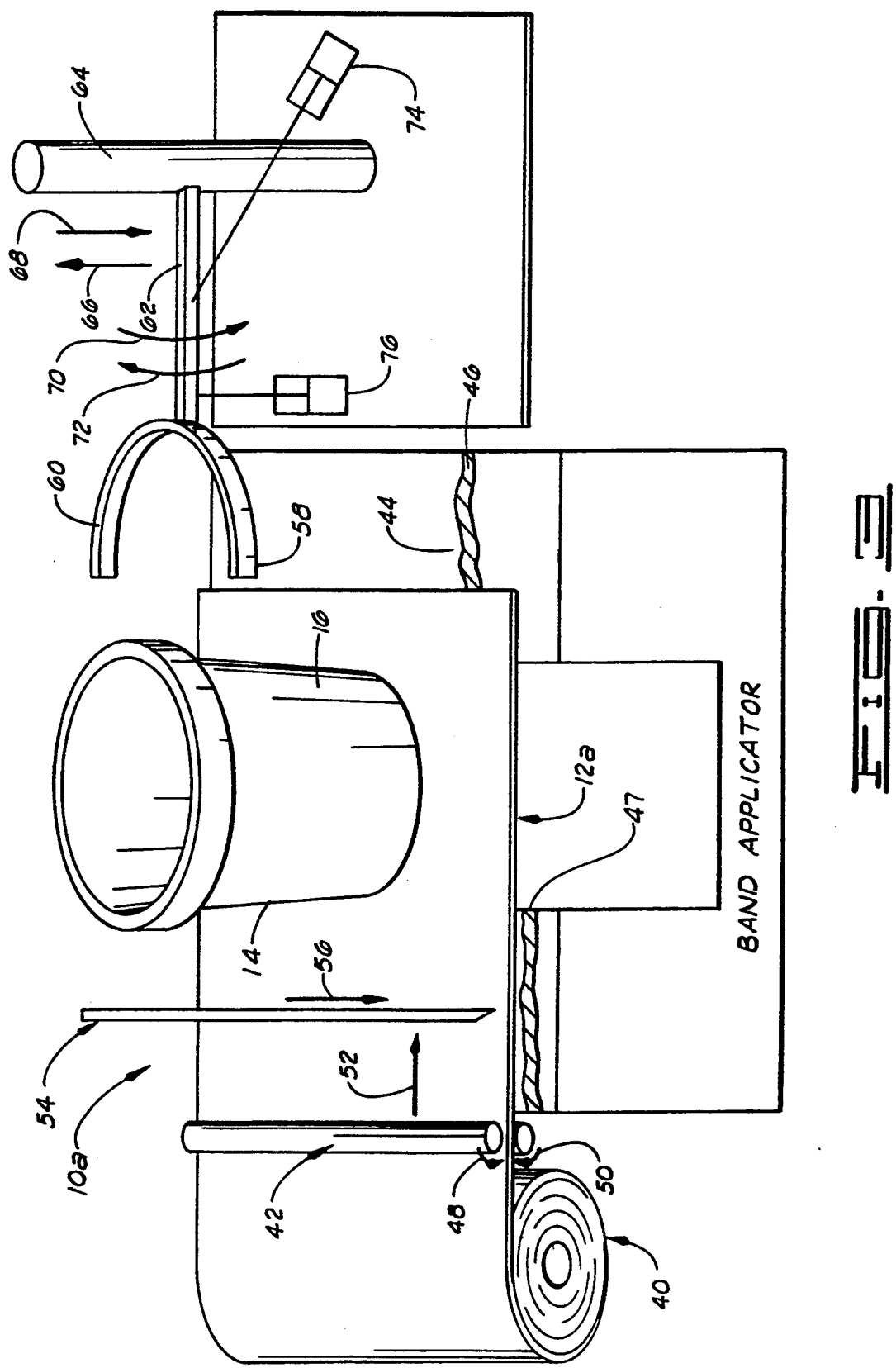
FIG. 3 is a sectional, diagrammatic view showing a system for automatically feeding the material to be applied about the flower pot to the band applicator.

Shown in FIG. 3 is a modified system 10a for securing a sheet of material about the flower pot 16 in a manner like that described before with respect to FIGS. 1 and 2. The system 10a includes a roll of material 40 which is supported so that material may be unrolled from the roll of material 40. The material in the roll of material 40 extends from the roll of material 40 through a pair of rollers 42 and over a portion of an upper surface 44 of a platform 46. The platform 46 includes a flower pot opening 47.

At least one of the rollers 42 is powered so that by rollingly actuating the rollers 42, the rollers 42 are rotated in the respective directions 48 and 50 as indicated in FIG. 3 to move the material in a general direction 52 to a position to wherein a predetermined amount of the material has been disposed generally over the flower pot opening 47 in the platform 46. After a predetermined amount of the material has been unrolled from the roll of material 40 and positioned generally over the flower pot opening 47, a knife 54 is actuated and moved in a downward direction 56 to a position wherein the knife 54 cuttingly engages the material thereby severing a sheet of material 12a from the roll of material 40. The knife 54 is shown in FIG. 3 in the cutting position.

The system 10a also includes a generally U-shaped fork 58 forming an opening 60 which is connected to one end of a bar 62. The opposite end of the bar 62 is movably connected to a post 64 so that the bar 62 may be moved in an upward direction 66 or in a downward direction 68. The bar 62 also is pivotally connected to the post 64 so that the bar 62 may be rotated in a first direction 70 and in a second direction 72.

A first hydraulic cylinder 74 is connected to the bar 62 for moving the bar 62 in the upward or the downward direction 66 or 68. A second hydraulic cylinder 76 is connected to the bar 62 for moving the bar 62 in the direction 70 or 72.

In operation, the flower pot 16 is disposed in the opening 60 and the fork 68 and supported in the fork 68. The bar 62 is moved by the hydraulic cylinder 74 and 76 to position the flower pot 16 generally over the flower pot opening 47 and over the object opening 30 in the band applicator 20. After the sheet of material 12a has been cut from the roll of material 40, the second hydraulic cylinder 76 is actuated to move the bar 62 and the flower pot 16 connected thereto in the downward direction 68 thereby moving the flower pot 16 and the sheet of material 12a through the flower pot opening 47 into the object opening 30 and the band applicator 20. The band applicator 20 then is actuated to apply the band about the sheet of material 12a and generally about the outer peripheral surface 14 of the flower pot 16 thereby securing the sheet of material 12a to the outer peripheral surface 14 of the flower pot in the manner described.

After the band has been applied to the sheet of material 12a and the flower pot 16, the second hydraulic cylinder 76 is actuated to move the bar 62 and the flower pot 16 connected thereto in the upward direction 66 to a position to wherein the flower pot 16 is positioned generally above the flower pot opening 47 generally above the upper surface 44 of the platform 46. The first hydraulic cylinder 74 then is actuated to pivotally move the bar 62 and the flower pot connected thereto in the direction 72 so the flower pot 16 with the sheet of material 12a secured thereto by the band can be removed from the fork 58 and another flower pot can be disposed in the fork 58.

Changes may be made in the construction and operation of the various components and assemblies described herein, and changes may be made in the steps or the sequence of the steps described herein without departing from the spirit and the scope of the invention as defined in the following claims.

What is claimed is:

1. A method for wrapping a flower pot with a decorative cover utilizing a cover forming device comprising a platform having an upper support surface and a flower pot opening which is formed therethrough and an automatic band applicator with an object opening adapted to substantially automatically apply a band, the automatic band applicator being disposed below the upper support surface of the cover forming device, the method comprising the steps of:

providing a flower pot having an outer peripheral surface and an upper opening;

disposing a sheet of material on the upper support surface of the platform of the cover forming device so that the sheet of material extends over the flower pot opening in the cover forming device;

placing the flower pot over the flower pot opening in the cover forming device;

moving the flower pot downwardly into engagement with the sheet of material and through the flower pot opening in the cover forming device for forming a decorative cover about the outer peripheral surface of the flower pot while leaving the upper opening of the flower pot substantially uncovered and simultaneously holding the decorative cover in place disposed substantially about the outer peripheral surface of the flower pot;

moving the flower pot having the decorative cover formed substantially about the outer peripheral surface thereof downwardly into the object opening in the band applicator while the decorative cover is held in place disposed substantially about the outer peripheral surface of the flower pot via the cover forming device; and automatically applying a band about the flower pot and decorative cover for securing the decorative cover about the outer peripheral surface of the flower pot while the cover forming device holds the decorative cover in place around the flower pot and while leaving the upper opening in the flower pot substantially uncovered; and removing the flower pot having the decorative cover secured thereto by the band from the object opening in the band applicator and from the flower pot opening in the cover forming device.

2. The method of claim 1 wherein the step of disposing the sheet of material over the flower pot opening in the cover forming device further comprises the steps of:

unrolling material from a roll of material and moving a portion of the material over the flower pot opening of the cover forming device; and cutting the material from the roll of material to form the sheet of material placed over the flower pot opening of the cover forming device.

* * * * *

UNITED STATES PATENT AND TRADEMARK OFFICE
CERTIFICATE OF CORRECTION

PATENT NO. : 5,417,033
DATED : May 23, 1995
INVENTOR(S) : Weder

It is certified that error appears in the above-identified patent and that said Letters Patent is hereby corrected as shown below:

Column 2, line 24, delete "10."

Column 2, line 30, delete "10."

Column 2, line 44, delete "30" and substitute therefor -- 20 --.

Column 4, line 29, delete the two occurrences of "fork 68" and substitute therefor -- fork 58 --.

Signed and Sealed this

Ninth Day of April, 1996

Attest:

BRUCE LEHMAN

*Attesting Officer*   *Commissioner of Patents and Trademarks*